(12) United States Patent
Kreider

(10) Patent No.: US 6,713,126 B2
(45) Date of Patent: Mar. 30, 2004

(54) PARTICULATE METERING AND ALIGNMENT APPARATUS

(75) Inventor: Kent A. Kreider, River Forest, IL (US)

(73) Assignee: Mars, Incorporated, McLean, VA (US)

( * ) Notice: Subject to any disclaimer, the term of this patent is extended or adjusted under 35 U.S.C. 154(b) by 6 days.

(21) Appl. No.: 10/153,695

(22) Filed: May 24, 2002

(65) Prior Publication Data

US 2003/0217690 A1 Nov. 27, 2003

(51) Int. Cl.⁷ .................................... B05D 1/26
(52) U.S. Cl. ............................. 427/180; 427/201
(58) Field of Search .................. 427/180, 186, 427/196, 201, 600; 222/58, 198–200; 118/22, 24, 57, 308

(56) References Cited

U.S. PATENT DOCUMENTS 4,679,708 A * 7/1987 Spence
5,657,902 A * 8/1997 Kraus

* cited by examiner

Primary Examiner—Fred J. Parker
(74) Attorney, Agent, or Firm—Fitzpatrick, Cella, Harper & Scinto

(57) ABSTRACT

A particulate metering and alignment apparatus and to a method of producing a plurality of parallel streams of nested particulates for distribution onto a substrate at a desired discharge rate using the apparatus of the invention. The apparatus puts a product feeder in functional communication with a vibrating bed feeder. The discharge rate of the apparatus is controlled by adjusting the angle of tilt of one or more nozzles that distribute particulate material from the product feeder onto the vibrating bed feeder portion of the apparatus.

6 Claims, 8 Drawing Sheets

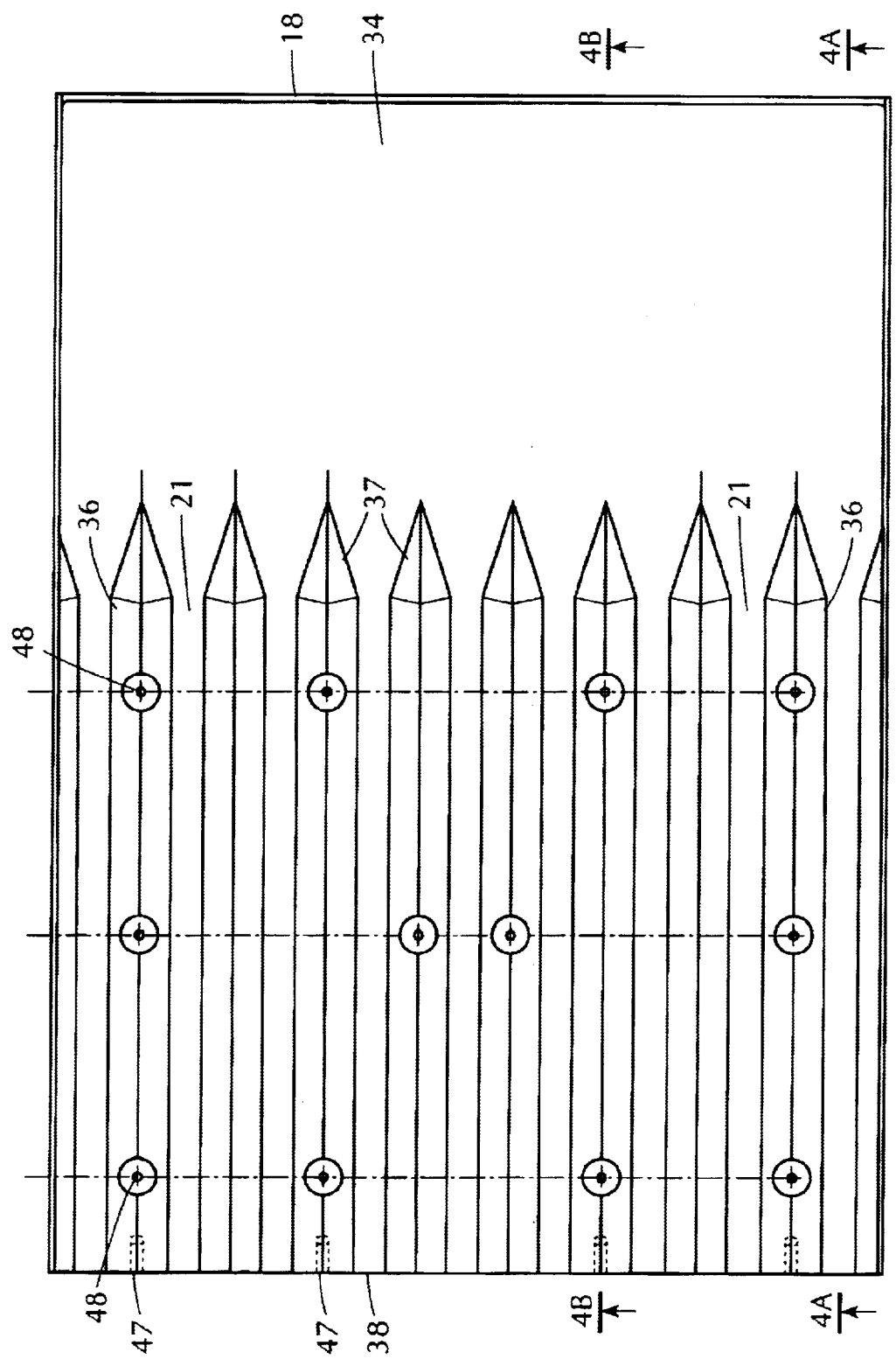

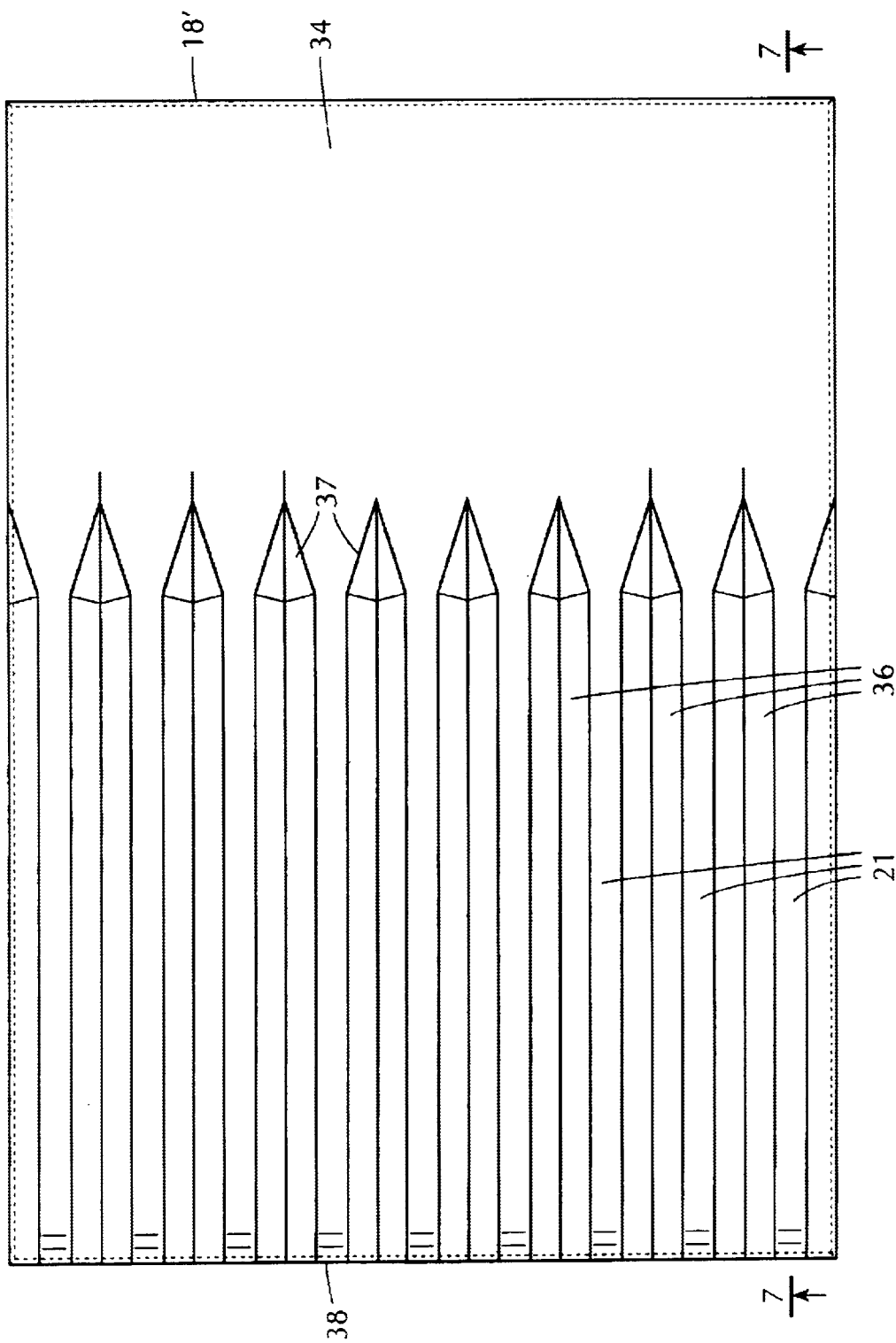

PARTICULATE METERING AND ALIGNMENT APPARATUS

BACKGROUND OF THE INVENTION

1. Field of the Invention

The present invention generally relates to a particulate metering and alignment apparatus. In particular, the present invention relates to a particulate metering and alignment apparatus, comprising a product feeder and a vibrating bed feeder, which may be used to provide a substantially uniform flow of particulates for distribution onto a flow of substrate.

2. Related Background Art

A wide variety of equipment is known for transporting and/or metering particulate material, such as, e.g., food products, coal and other mineral material, and dry goods handled in solid particulate form. When used to coat a flow of a substrate with particulate material, transport or metering equipment must provide a uniform flow of tightly nested particulates without particulate bridging to provide a uniform coating on the substrate.

Known transport and metering systems require two or more pieces of equipment to feed and provide the desired flow of particulates. The use of multiple devices increases the space required for the transport and metering systems, as well as the capital costs. Therefore, a need exists for a particulate metering and alignment apparatus that combines the metering and transport functions in a single, smaller device, and provides at least one stream of tightly nested flow of particulates. No device, known at the time of the present invention, combines metering, distribution, and streaming of particulates. The present invention provides such a device.

SUMMARY OF THE INVENTION

The present invention is directed to a particulate metering and alignment apparatus and to a method of producing a plurality of parallel streams of nested particulates for distribution onto a substrate at a desired discharge rate using the apparatus of the invention. The apparatus of the invention comprises a product feeder in functional communication with a vibrating bed feeder, and at least one tubular nozzle. The at least one nozzle is configured to discharge product from the product feeder onto the vibrating bed feeder at a desired product discharge rate, and has a variable angle of tilt relative to the vibrating bed feeder, where the at least one nozzle is configured such that the product discharge rate varies as the angle of tilt of the at least one nozzle is varied, and there is at least one angle of tilt at which no product is discharged.

The product feeder is preferably a loss-in-weight feeder, and preferably further comprises a hollow hopper, defining a product feeder discharge outlet and an interior volume for storing product to be metered and aligned. The at least one nozzle an inlet in functional communication with the product feeder discharge outlet and an outlet or orifice proximate to a product distribution zone of a vibrating bed feeder tray, where the at least one nozzle is positioned such that product discharged from the at least one nozzle outlet or orifice is deposited onto the product distribution zone of the vibrating bed feeder tray.

The method of the invention comprises the steps of placing particulate material of a given weight into a feeder hopper of a product feeder, discharging the particulate material from the hopper through at least one nozzle onto a vibrating bed feeder at a discharge rate determined by the angle of tilt of the nozzle, in conjunction with the vibrational frequency and amplitude of the vibrating bed feeder, adjusting the angle of tilt to obtain the desired discharge rate, forming a plurality of parallel streams of the particulate material on the vibrating bed feeder, and distributing the particulate material from the vibrating bed feeder onto a substrate.

Preferably, the method further comprises the steps of continuously monitoring the change in the weight of the particulate matter in the hopper as the particulate matter is discharged, determining the discharge rate from the change in weight, determining any change in the discharge rate, and adjusting the angle of tilt of the at least one nozzle to maintain the desired discharge rate.

The parallel streams may be formed by discharging the product from the at least one nozzle onto a product distribution zone of the vibrating bed feeder, and transporting the product on the distribution zone into a plurality of channels on the vibrating bed feeder. Preferably, the particulate matter is directed from the product distribution zone to the channels with one or more flow diverters or channel funnels, and the flow of the particulates in the channels is restricted to maintain a nested flow and/or is guided onto a substrate by a discharge guide at the discharge end of each product channel.

BRIEF DESCRIPTION OF THE DRAWINGS

FIG. 3 illustrates an embodiment of a vibration bed feeder tray useful in the invention;

FIG. 6 illustrates an alternate embodiment of a vibration bed feeder tray useful in the invention;

DETAILED DESCRIPTION OF THE INVENTION

Figure 1:
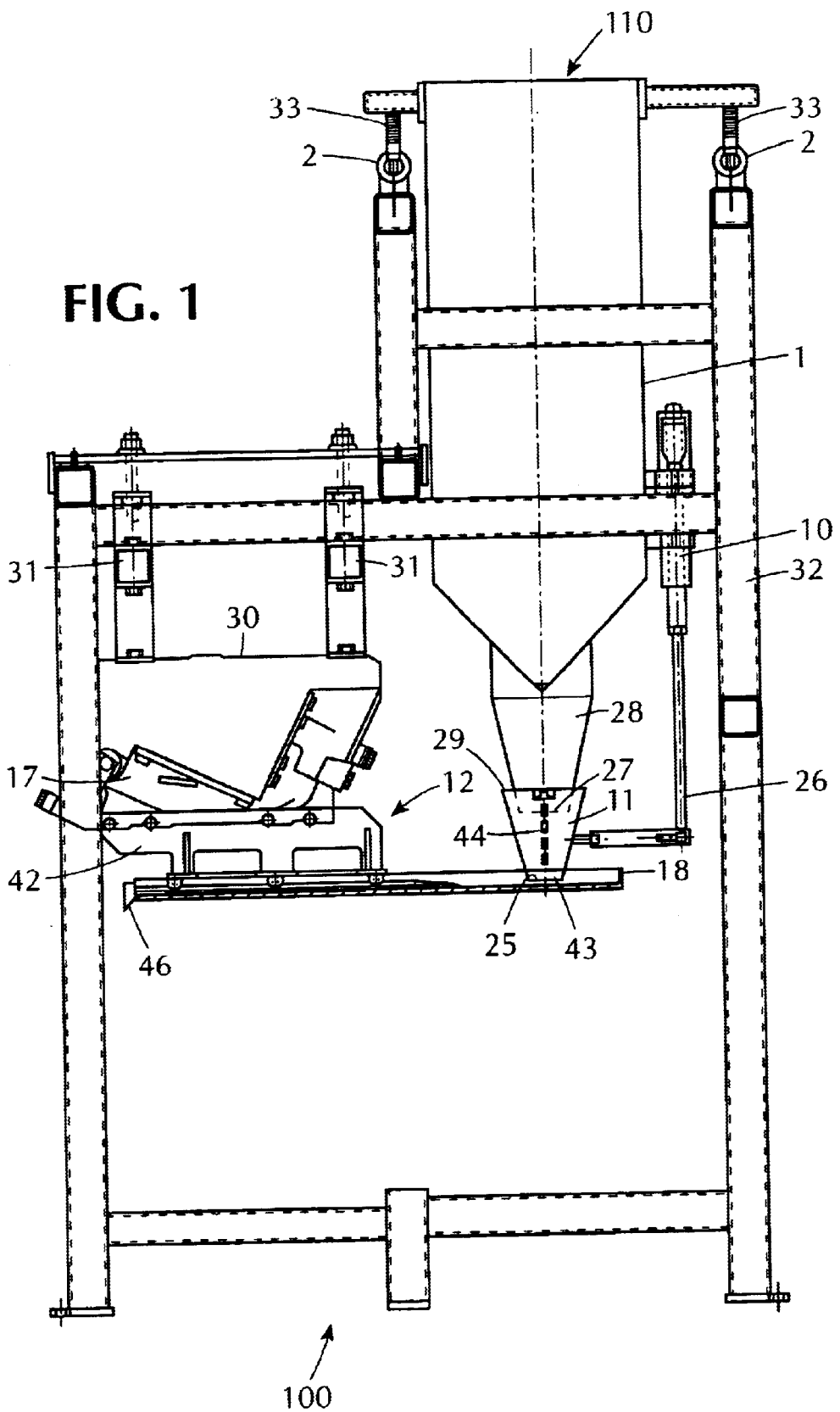
FIG. 1 illustrates a metering and alignment apparatus in accordance with the invention.

As used herein, the terms "tube" and "tubular" refer to any hollow object having a interior volume and a opening at each end of the tube that allows access into the hollow interior volume, such that an object of the appropriate size can pass into the opening at one end, through the interior volume, and out the opening at the other end. Tubes may have any appropriate cross-sectional area or shape, and each of the cross-sectional area and shape may vary independently along the length of the tube to form any shape or size required in the invention. The axis of any tube is defined by the geometrical centers of each cross section of the tube along the length of the tube, and may be straight, angled, or curved.

The present invention is directed to an apparatus or device for particulate metering and alignment. The apparatus of the invention combines, in a single device, a product feeder combined with a vibrating bed feeder to provide a continuous streamline flow of tightly nested particulates in which particulate bridging is substantially eliminated. The apparatus of the invention provides for the substantially uniform delivery of the stream of metered particles onto a substrate at a controlled rate.

The product feeder used in the invention comprises a product feeder discharge outlet in communication with at least one nozzle having a discharge flow rate that is determined by the angle of tilt of the nozzle relative to the product feeder and the vibrating bed feeder, by the shape of the nozzle orifice or outlet, and by the frequency and amplitude of vibration of the vibrating bed feeder. The discharge flow rate is controlled by varying the angle of the nozzle. Preferably, the product feeder is a loss-in-weight feeder.

The nozzle and the nozzle orifice are shaped to meet the properties and flow requirements of the discharged material, such as, e.g., the angle of repose of the material, particle size, and flowability. The optimum side angle, i.e., the steepness, of the nozzle for a given flow rate depends upon the angle of repose and the flowability of the material. Preferably, a steep side angle is used for the hopper to prevent bridging, and the side angle of the nozzle is relatively shallow to provide clearance between the hopper and the nozzle. This allows the nozzle to tilt. The size of the nozzle orifice depends, in part, on the flowability of the material, and is also selected to provide adequate coverage on the bed. The number of nozzles in the apparatus of the invention also affects the amount of bed coverage and, thus, the size of each nozzle orifice. However, the most important factor in determining nozzle orifice size for a particular material flow rate is particle size. The shape of the nozzle orifice is dependent upon the flow characteristics of the product and the flow rate desired.

The discharge flow rate is controlled by varying the tilt or angle of the nozzle in conjunction with the vibrational amplitude and frequency of the vibratory feeder. For example, for a nozzle having the shape of an inverted, truncated right circular cone, the truncated apex of the cone will point straight down when the base of the cone is horizontal. Tilting the cone produces a gap between the truncated apex of the cone and a horizontal plane beneath the apex. The gap widens as the tilt of the cone is increased, and, when the angle of tilt exceeds a certain critical angle, particles flow from a nozzle orifice at the tip of the cone.

A variety of nozzle orifice shapes have been found to be useful in the apparatus of the invention. The shape of the nozzle orifice is determined by the shape of the truncation line, i.e., the line along which a cone is cut to truncate the cone. In a nozzle in the shape of a right circular cone, a straight truncation line will form either a circular or elliptical nozzle orifice, depending on whether or not the truncation line is perpendicular to the central axis of the cone shape. That is, the shape of the nozzle is a conic section, which is a circle when the straight truncation is perpendicular to the axis of the cone and an ellipse when the angle between the straight truncation line and the cone axis is less than 90°, and greater than the angle between the side of the cone and the cone axis. Other truncation line shapes are also useful in the invention. For example, the truncation line may be in the form of a parabolic arc, a circular arc, or any other shape that is found to provide a nozzle orifice shape useful in the invention where the shape of the curve is defined as that projected onto a plane parallel to the axis of the cone. In addition, once the truncation line has been formed, it may be useful to form a notch in an edge of the orifice. A particularly useful nozzle orifice shape is a circular orifice with a "V" notch.

Where the nozzle is an inverted right truncated cone, a circular nozzle orifice is preferred, as the "zero angle", i.e., the angle of tilt at which there is no discharge flow, occurs when nozzle orifice is horizontal. That is, for a nozzle in the form of an inverted truncated right cone having a circular orifice, the zero angle occurs when the straight truncation line is horizontal or, equivalently, when the central axis of the right cone is vertical. For other orifice shapes, such as, e.g., ellipses, orifices formed with truncation lines in the form of circular and parabolic arcs and the orifices having a notch, a negative angle of tilt is typically required to completely close the discharge opening, and stop the discharge flow. A negative angle of tilt is defined as an angle of tilt in the direction opposite the direction of rotation that opens the nozzle.

The preferred shape of the nozzle is an inverted truncated cone having a circular orifice. However, those of ordinary skill in the art will recognize that a variety of nozzle shapes are useful for the nozzle of the invention. For example, an inverted truncated pyramid having a polygonal shaped base that has three or more sides, but is preferably square or rectangular, may be useful with the invention. Other useful nozzles may be generally tubular in shape that are straight, curved, angled, or some combination thereof. The cross section of such tubes may have a shape that is constant or varies along the length of the tube. The only constraints are that the nozzle must have an orifice shaped such that, when the angle of tilt of the nozzle relative to the hopper or vibrating bed feeder is varied, the discharge flow rate of the nozzle also varies, and that there is a zero angle at which the discharge flow stops.

The vibrating bed feeder is preferably configured, such as, e.g., by machining, to provide the simultaneous streamline-like flow of particulates in one or more lanes. The vibrating plate is preferably sufficiently smooth to prevent particle bridging, and may be coated with an anti-stick coating, such as, e.g., TEFLON®, to substantially eliminate bridging.

Preferably, the vibrating bed feeder comprises a substantially flat product distribution area, positioned under the hopper nozzles, and shaped flow diverters positioned on the vibrating bed feeder used to funnel particulates from the product distribution area of the vibrating bed feeder into a series of flow channels in or on the vibrating bed feeder. The terminal ends of the flow channels may be configured to create back pressure sufficient to prevent discharge of the particles from the vibrating bed feeder unless a sufficient number of particulates are in the channel to force the discharge of any particles at the terminal end of the channels. This may be accomplished, e.g., by reducing the depth and/or the width of the channels at the terminal end, where the reduction in the depth and/or width of the channels is a function of the size and mass of the particulates fed along the channels.

Preferably, the vibrating bed feeder further comprises a discharge guide at the discharge end of the feeder, configured to direct the discharge of particulates from the vibrating feeder onto the flow of substrate beneath the end of the vibrating bed feeder. The feeder guide preferably maintains nesting of the particulates that occurs in the channels, and prevents particulates from falling to either side of the desired path.

Preferably, the apparatus of the invention is positioned over a substrate flow, such that the discharge of particulates from the vibrating bed feeder provides a uniform coating on the substrate. The combination of a product feeder and a vibrating bed feeder in a single device significantly reduces the space required for two separate pieces of equipment, as well as capital costs. In addition, particulate degradation is significantly reduced compared to that caused by shear in auger-type feeders.

An embodiment of the particulate metering and alignment apparatus of the invention is generally illustrated in FIG. 1, which provides a side elevation view. As illustrated in FIG. 1, apparatus 100, comprises a product feeder 110 and a vibration bed feeder 12. Product feeder 110 comprises a hopper 1 and at least one hollow hopper nozzle 11 in functional communication with at least one hopper discharge orifice 27 formed in a portion of hopper 1, where discharge orifice 27 is the discharge outlet for product feeder 110. Preferably, hopper 1 comprises at least one hopper discharge transition or cone 28, where each hopper discharge transition or cone 28 is configured to direct a flow of product from hopper 1 to a nozzle 11 through hopper discharge orifice 27 formed in an end of hopper discharge transition 28. In addition, product feeder 110 preferably further comprises one or more load cells 2, configured to monitor the weight of hopper 1 and any material within hopper 1 to allow monitoring of the feed rate of material from the hopper.

Figure 2A:
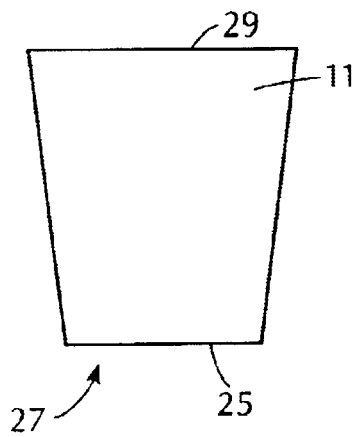
FIG. 2 illustrates a nozzle useful in the invention.
Figure 2B:
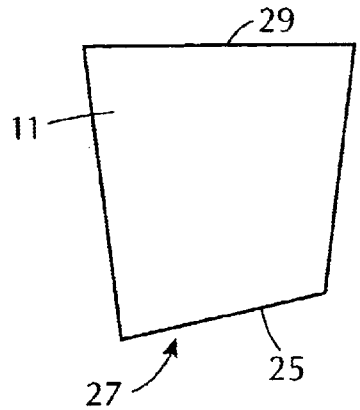
Figure 2C:
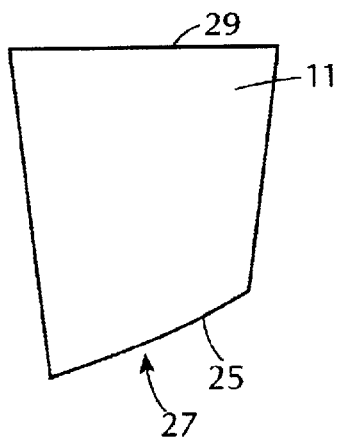
Figure 2D:
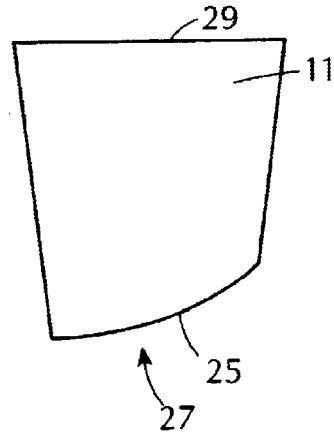
Figure 2E:
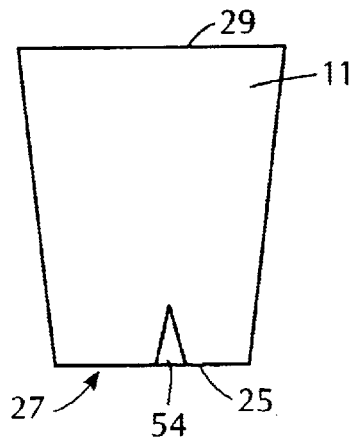

Nozzles 11, as illustrated in FIGS. 1 and 2A, are preferably in the form of a hollow inverted truncated cone, having a circular orifice 43 formed by a straight, truncation line 25, perpendicular to cone axis 44. That is, the base 29 of the truncated cone that forms nozzle 11 is at the top of the nozzle, and the truncation line 25, i.e., the line along which the cone is cut to form the truncated cone, defines circular nozzle orifice 43 at the bottom of nozzle 11. As discussed above, other nozzle shapes may be utilized, as long as the nozzle has an orifice 43 shaped such that, when the angle of tilt of nozzle 11 relative to vibrating bed feeder 12 is varied, the discharge flow rate from nozzle 11 also varies. For example, truncation line 25 may be in the form of a straight line angled at less than 90° to axis 44, as illustrated in FIG. 2B, truncation line 25 may be in the form of a circular arc, as illustrated in FIG. 2C, or truncation line 25 may be in the form of a parabolic arc, as illustrated in FIG. 2D. Moreover, nozzle 11 may further comprise a notch 45, such as, e.g., a "V" notch 54, as illustrated in FIG. 2E. The angle of tilt of nozzles 11 is preferably adjusted by a linear motor 10 that is connected to nozzles 11 by a linear motor arm 26. Extending or retracting linear motor lever arm 26 with linear motor 10 varies the angle of tilt of nozzles 11.

Vibrating bed feeder 12 comprises a vibrating bed feeder tray 18 and a vibrating bed feeder drive 30, which includes a vibrating bed feeder motor 17, where vibrating bed feeder tray 18 is supported by a tray support 42, which also connects vibrating bed feeder tray 18 to vibrating bed feeder drive 30. As vibration of vibrating bed feeder 12 can have a deleterious effect upon the longevity of apparatus 100, vibrating bed feeder 12 is preferably isolated from the other parts of apparatus 100 by one or more isolators 31, which may be, e.g., metal or elastomeric springs, shock absorbers or dampers, elastomeric supports or mounts, or any other useful device known in the art that absorbs or prevents the transmission of vibration.

Product feeder 110 and vibrating bed feeder 12 are preferably supported and oriented, one to the other, by a frame or support structure 32. As it may be desirable to vary the relative positions of hopper 1 and vibrating bed feeder 12, product feeder 110 and vibrating bed feeder 12 may be attached to support structure 32 by one or more positioning devices 33. Various mechanical, hydraulic, and pneumatic positioning devices are well known in the art, including, but not limited to jacking bolts and pneumatic or hydraulic struts.

One embodiment of vibration bed feeder tray 18 illustrated in FIG. 1 is generally illustrated in a plan view in FIG. 3. Vibration bed feeder tray 18 is preferably machined from a single piece of material, but may also be assembled from separate parts by, e.g., welding, adhesives, or mechanical fasteners to provide the desired profile or geometry. However, as vibrating bed feeder 12 vibrates, forming vibration bed feeder tray 18 by machining a single piece of material is most preferred to prevent separation of parts. Vibration bed feeder tray 18, as illustrated in FIG. 3, comprises a product distribution zone 34, which is preferably substantially flat, at a first end of tray 18, and a plurality of product or particulate channels 21, separated by channel walls 36, and extending from product distribution zone 34 to a discharge end 38 of tray 18 from which particulate material 40 is discharged. As illustrated in FIG. 3, that portion of each channel 21 adjacent to product distribution zone 34 is in the form of a flow diverter or channel funnel 37 to direct particulate material 40 from product distribution zone 34 into channel 21.

Figure 4A:
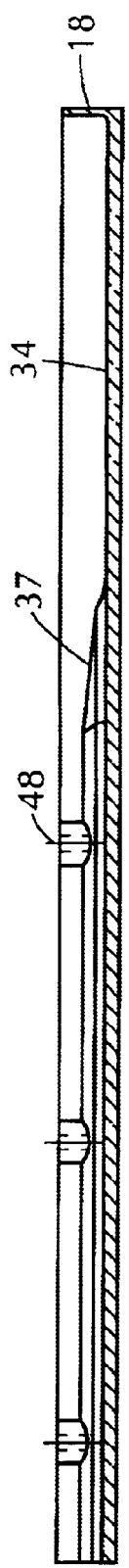
FIG. 4 illustrates cross-sectional views of the vibration bed feeder tray of FIG. 3.
Figure 4B:
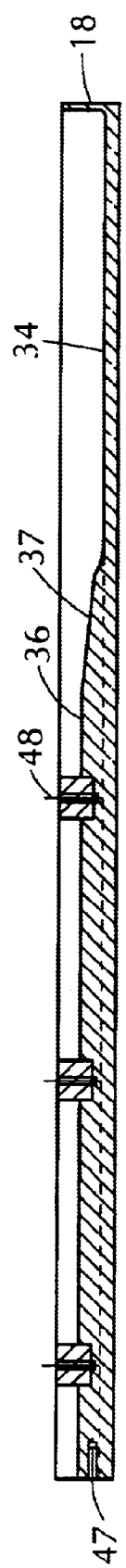

A discharge guide 46 may be positioned at discharge end 38 of each channel 21, as illustrated in FIG. 1. Discharge end 38 may be configured as a discharge guide 46, or, as illustrated in FIG. 3, tray 18 may be configured to provide attachment points for attachment of separate discharge guides 46 at one or more discharge guide mounting points 47. Moreover, discharge guides 46 may be combined in at least one discharge guide unit 49 that may be attached to tray 18 at mounting points 47, as illustrated in FIGS. 4 and 5. In addition, tray 18 preferably comprises one or more tray support mounting points 48 for attaching tray 18 to tray support 42. Cross sectional views of tray 18 along lines A—A and B—B are provided in FIGS. 4A and 4B, respectively.

Figure 5A:
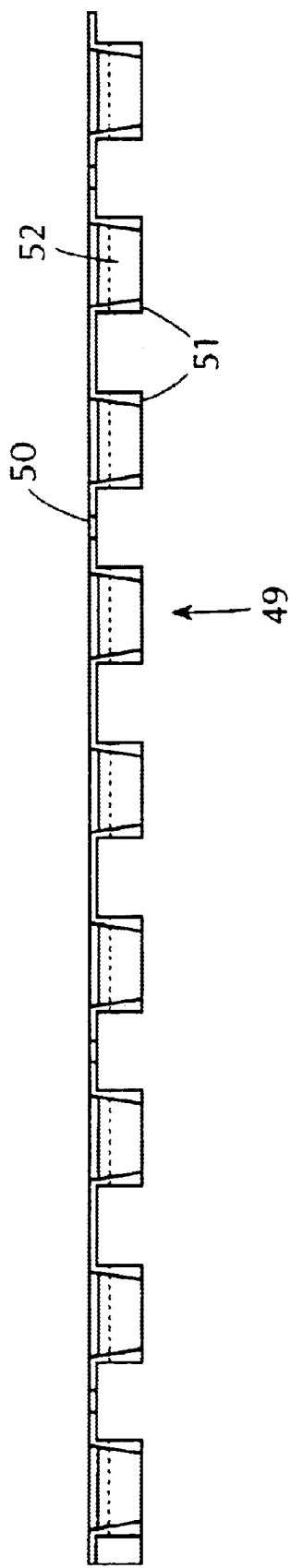
FIG. 5 illustrates a discharge guide unit useful in the invention.
Figure 5B:
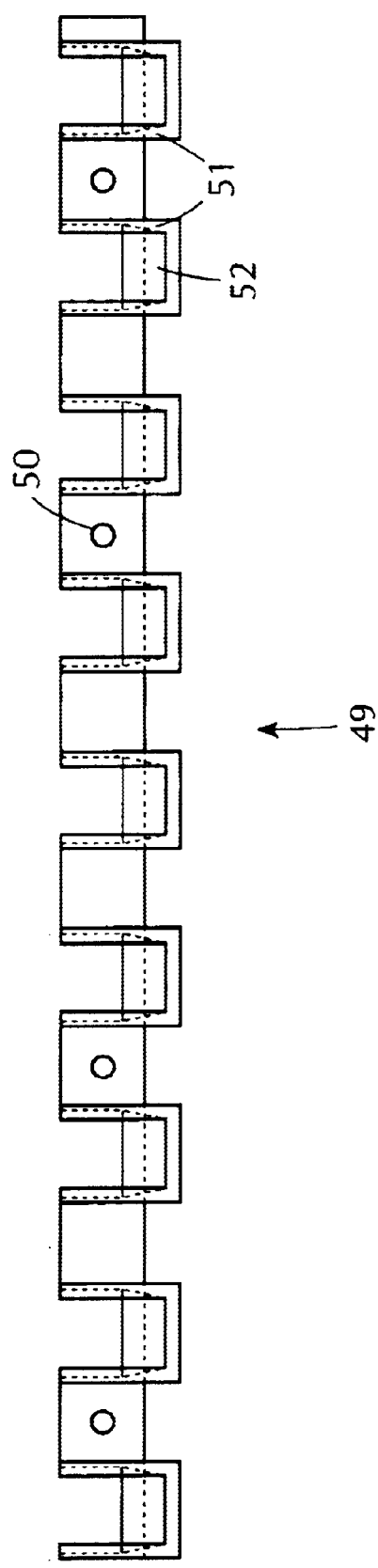

Preferably, where removable discharge guides 46 are used, the individual discharge guides 46 are combined in a single discharge guide unit 49. Top and end views of a preferred discharge guide unit 49 are illustrated in FIGS. 5A and 5B, respectively. Discharge guide unit 49 comprises a plurality of discharge guides 46, each of which comprises a pair of sides 51 and a slide 52, and a plurality of discharge guide unit connectors 53. Preferably, discharge guide unit connectors 53 define discharge guide mounting holes 50 for attaching discharge guide unit 49 to mounting points 47 using screws, bolts or the like (not shown).

A further embodiment of a vibration bed feeder tray is generally illustrated in a plan view in FIG. 6. As with the vibration bed feeder tray illustrated in FIG. 3, vibration bed feeder tray 18' comprises a product distribution zone 34 at a first end of tray 18', a plurality of product or particulate channels 21, separated by channel walls 36, and extending from product distribution zone 34 to discharge end 38 of tray 18' from which particulate material 40 is discharged. That portion of each channel 21 adjacent to product distribution zone 34 is preferably in the form of a flow diverter or channel funnel 37 to direct product from product distribution zone 34 into channel 21. As with tray 18, illustrated in FIG. 3, tray 18' is preferably machined from a single piece of material, but may also be assembled from separate parts. As illustrated in FIG. 6, discharge end 38 of each channel 21 is configured to restrict or prevent discharge of particulate material 40 from discharge end 38 of tray 18' onto substrate material 22 in substrate feeder 41 unless there is an accumulation of particulate material behind and pushing on the particulate material at discharge end 38 of channel 21. Such a configuration provides substantially complete coverage of material or substrate 22 in substrate feeder 41. As illustrated in FIG. 6, tray 18' does not use discharge guides 46 in contrast to tray 18 illustrated in FIG. 3, which is designed to accept discharge guides 46. However, discharge guides may used with or without the channel restrictions illustrated in FIG. 6.

Figure 7:
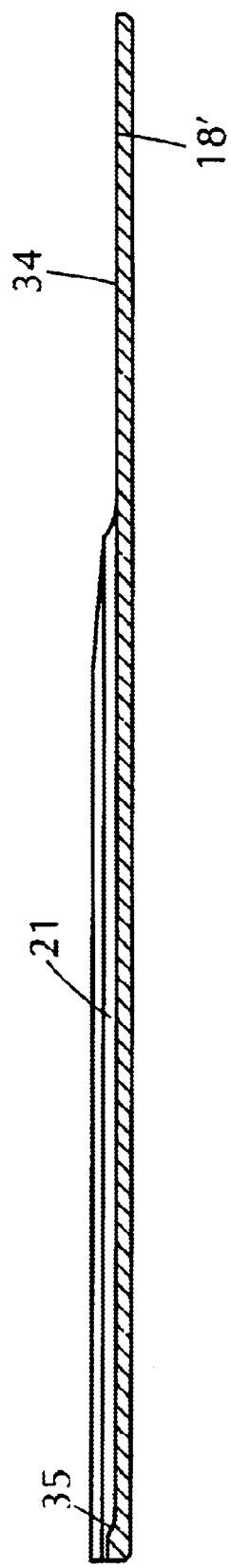
FIG. 7 illustrates a cross section of the tray of FIG. 6.
Figure 8:
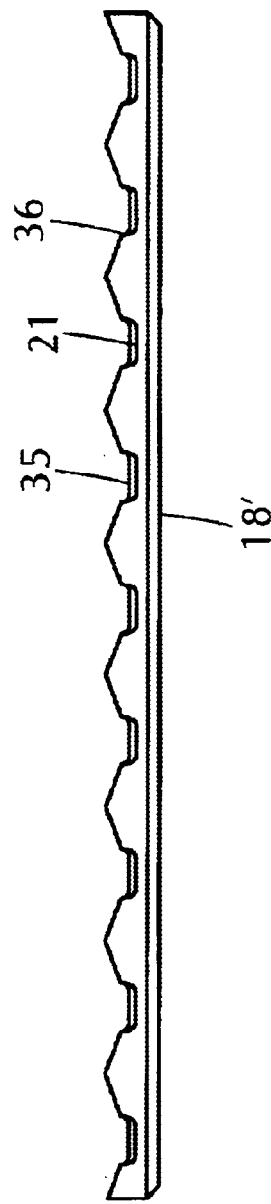
FIG. 8 illustrates a view of the discharge end of the tray of FIG. 6.

Any configuration of discharge end 38 of each channel 21 that will provide the desired restriction, such as, e.g., a narrowing of the width of channel 21 at discharge end 38, may be used in the present invention. Preferably, the restriction is obtained by providing an incline 35 in discharge end 38 as shown in FIG. 7, which is a cross section of FIG. 6 along line 7—7, and in FIG. 8, which is an end view of feeder tray 18'. For certain products, the restriction may be reduced or eliminated, as with tray 18 illustrated in FIG. 3.

Figure 9:
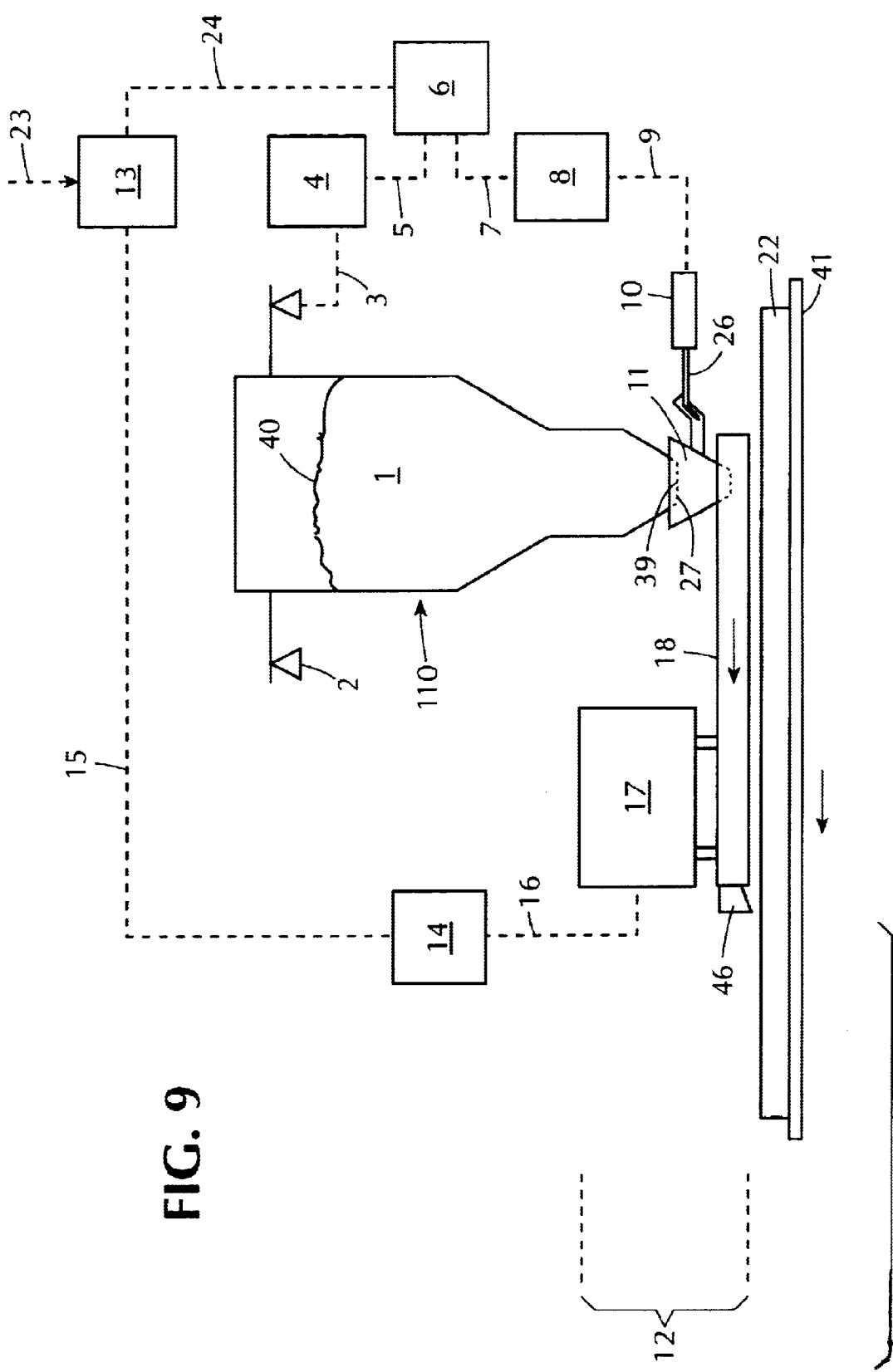
FIG. 9 is a schematic of an apparatus of the invention.

A preferred embodiment of the particulate metering and alignment apparatus of the invention is generally illustrated in FIG. 9, where the arrows indicate the direction of travel of particulate material 40 and substrate 22. The apparatus illustrated in FIG. 9 comprises a hopper 1 of a product feeder 110 for storing particulate material 40. Preferably, product feeder 110 is a loss-in-weight feeder, and comprises hopper 1 and at least one nozzle 11 positioned proximate to a vibrating bed feeder 12, which comprises a vibrating feeder tray 18 positioned under nozzle 11.

The preferred apparatus illustrated in FIG. 9 functions as follows: Particulate material to be metered 40 is placed in hopper 1, which is supported by a plurality of load cells 2. Load cells 2 continuously monitor the total weight of particulate material 40 and hopper 1, and, thus, provide a measure of the discharge rate of particulate material 40 from hopper 1, based on the change in the weight measured by load cells 2. Load cells 2 provide signals 3 that are summed in summing junction box 4, which provides a signal 5 to a scale controller 6. Summing junction box output 5 changes at a rate proportional to the change in the weight of particulate material 40 in hopper 1, and, thus, the rate of change in output 5 is indicative of the discharge of particulate material 40 from hopper 1 through nozzle(s) 11. Scale controller 6 compares the discharge rate, i.e., the rate of change in the weight of particulate material 40 in hopper 1, as indicated by output 5, to the discharge rate desired, as indicated by a scale controller set point.

The actual discharge rate from hopper 1 is controlled by varying the angle of tilt of nozzle(s) 11. Scale controller 6 provides an output 7 to a linear motor drive 8. When the actual discharge rate of particulate material 40 from hopper 1 differs from the desired rate, linear motor drive 8 sends a signal 9 to at least one linear motor 10, causing linear motor 10 to extend or retract linear motor arm 26, which connects linear motor 10 to nozzle(s) 11. Nozzle(s) 11 are functionally connected to product feeder discharge outlet 28 by a hinge or articulation point 39. When linear motor 10 extends or retracts linear motor arm 26, nozzle(s) 11 pivot, changing the orientation of nozzle discharge orifice 43 relative to feeder tray 18, and, thus, changing the discharge rate of particulate material 40 from hopper 1 onto feeder tray 18.

Vibrating bed feeder 12 and scale controller 6 are independently controlled by a Programmable Logic Controller (PLC) 13. PLC 13 is a supervisory level control device, capable of overseeing operation of a plurality of devices. In this embodiment of the present invention, an operator inputs the desired production rate 23 into PLC 13, which calculates the set point of scale controller 6, and provides the set point to scale controller 6 by set point signal 24.

A look-up table in residence in PLC 13 relates the desired production rate to predetermined delivery rates of vibrating bed feeder 12, which delivers particulate material at a linear speed proportional to that of a substrate 22 onto which vibrating bed feeder 12 discharges particulate material 40. The relationship between the amplitude of vibrating bed feeder 12 and the linear velocity, i.e., the conveying rate, for a given feed product of particulate material 40 comprises the feeder look-up table. A signal 15 is sent from PLC 13 to a vibration motor controller 14, which then sends an output 16 to vibration feeder motor 17, thereby controlling the amplitude of vibrating bed feeder tray 18. Particulate material 40 is transported along vibrating feeder tray 18 by the vibrations of the tray to discharge end 38, and discharged onto substrate 22, preferably, through discharge guide 46, where substrate 22 is transported under discharge end 38 by substrate feeder 41 at a rate corresponding to the discharge rate from discharge end 39.

This invention is not limited by the embodiments disclosed herein and it will be appreciated that numerous modifications and embodiments may be devised by those skilled in the art. Therefore, it is intended that the appended claims cover all such modifications and embodiments that fall within the true spirit and scope of the present invention.

What is claimed is:

1. A method of producing a plurality of parallel streams of nested particulates for distribution onto a substrate at a desired discharge rate, the method comprising the steps of:

placing particulate material having a weight into a product feeder hopper;

discharging the particulate material from the hopper through at least one tubular nozzle onto a vibrating bed feeder at a discharge rate determined by an angle of tilt of the nozzle relative to the vibrating bed feeder;

adjusting the angle of tilt to obtain the desired discharge rate;

forming a plurality of parallel streams of the particulate material on the vibrating bed feeder; and distributing the particulate material from the vibrating bed feeder onto a substrate.

2. The method of claim 1, further comprising:

continuously monitoring a change in the weight of the particulate matter in the hopper;

determining the discharge rate from the change in weight;

determining any change in the discharge rate; and adjusting the angle of tilt of the at least one nozzle, thereby maintaining the desired discharge rate.

3. The method of claim 1, further comprising, adjusting the angle of tilt to a zero angle to stop product discharge when discharge is not required.

4. The method of claim 1, further comprising forming the parallel streams by discharging the product from the at least one nozzle onto a product distribution zone of the vibrating bed feeder; and transporting the product on the distribution zone into a plurality of channels on the vibrating bed feeder;

thereby forming a plurality of parallel streams.

5. The method of claim 4, further comprising directing the particulate matter from the product distribution zone to the channels with one or more flow diverters or channel funnels.

6. The method of claim 4, further comprising restricting flow of the particulates in the channels to maintain a nested flow.

* * * * *